(12) United States Patent
Henderson

(10) Patent No.: US 6,366,835 B1
(45) Date of Patent: Apr. 2, 2002

(54) HEIGHT ESTIMATING APPARATUS

(75) Inventor: Geoffrey T Henderson, Plymouth (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/530,875

(22) PCT Filed: Mar. 21, 2000

(86) PCT No.: PCT/GB00/01057

§ 371 Date: May 8, 2000

§ 102(e) Date: May 8, 2000

(87) PCT Pub. No.: WO00/57130

PCT Pub. Date: Sep. 28, 2000

(30) Foreign Application Priority Data

Mar. 24, 1999 (GB) .............................................. 9906781

(51) Int. Cl.$^7$ .......................... B64C 27/20; B64D 31/06
(52) U.S. Cl. .................... 701/4; 701/6; 701/8; 701/14; 702/150; 244/76 R; 244/175; 244/193; 244/190
(58) Field of Search .............................. 701/4, 3, 215, 701/220, 301, 2, 5, 8, 11; 342/462; 244/180, 190, 195

(56) References Cited

U.S. PATENT DOCUMENTS

| | | | |
|---|---|---|---|
| 3,296,422 A | 1/1967 | Rusler, Jr. ...................... 701/3 |
| 4,922,258 A | 5/1990 | Hassenpflug ................ 342/462 |
| 5,136,512 A | 8/1992 | Le Borne ................... 701/301 |
| 5,349,347 A | 9/1994 | Muller ........................ 340/969 |
| 5,415,031 A | 5/1995 | Colleu et al. ............. 73/178 R |
| 5,488,563 A | 1/1996 | Chazelle et al. ............. 701/301 |
| 5,590,044 A | 12/1996 | Buckreub .................... 701/220 |
| 5,657,232 A | 8/1997 | Ishikawa et al. ............ 701/215 |
| 5,730,394 A | * | 3/1998 | Cotton et al. ................ 244/180 |
| 5,901,927 A | * | 5/1999 | Ho .............................. 244/183 |
| 6,253,166 B1 | * | 6/2001 | Whitmore et al. .............. 703/2 |

FOREIGN PATENT DOCUMENTS

| | | |
|---|---|---|
| DE | 40 13 570 | 10/1991 |
| EP | 0 061 564 A1 | 10/1982 |
| EP | 0 763 749 A1 | 3/1997 |
| FR | 2 697 627 A | 5/1994 |
| GB | 2 293 452 | 3/1996 |

* cited by examiner

Primary Examiner—William A. Cuchlinski, Jr.
Assistant Examiner—Tuan C To
(74) Attorney, Agent, or Firm—Nixon & Vanderhye P.C.

(57) ABSTRACT

Apparatus for estimating a first height (1) of a vehicle (2) above a first reference surface (3), including a system (4) for determining position, velocity and attitude incorporating at least one sensing means (4b) operable to provide an output signal (5) indicative of a vertical specific force of the vehicle, error-estimating means (6) for receiving as input signals a horizontal reference velocity and position (4a) of the vehicle (2), and a radar altimeter measurement (7) of a second height (1b) of the vehicle (2) above a second reference surface (8) and for providing as an output signal (9) estimates of errors associated with the sensing means output signal (5), and integrating means (10) for receiving said sensing means and error-estimating means output signals (5, 9), and for subtracting the estimates of errors from the signal (5) indicative of vertical specific force while performing a double integration of the results of the subtraction, to provide an output indicative of the required estimated first height (1).

12 Claims, 2 Drawing Sheets

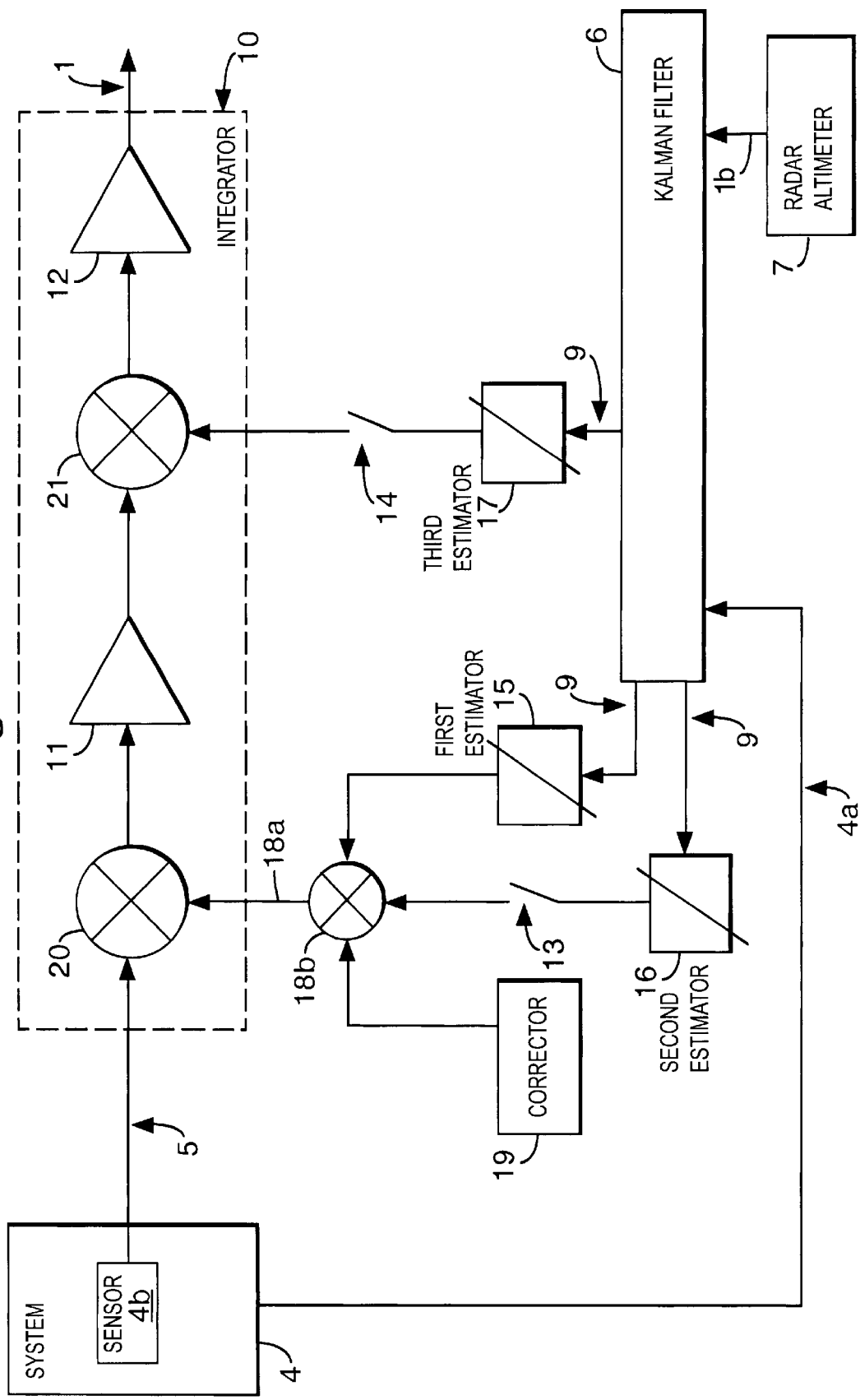

HEIGHT ESTIMATING APPARATUS

BACKGROUND OF THE INVENTION

1. Field of the Invention

This invention relates to a height estimating apparatus and method suitable particularly, but not exclusively, for estimating a first height of a vehicle above a first reference surface.

2. Discussion of Prior Art

Conventional apparatus used in aircraft navigation systems to estimate height of the aircraft above a fixed reference surface typically include instruments such as the baro-altimeter to estimate height above sea level, radar altimeter to estimate height above ground level, and can also include various configurations of laser and radar devices to estimate a height from obstacles to the aircraft. The baro-altimeter measurement is combined with various outputs from the aircraft's navigation system to provide a baro-inertial height, which is an estimate of the aircraft's height above sea level. The baro-inertial height is the least accurate of the various height measurements described above because the performance of the baro-altimeter is dependent on atmospheric conditions and the flight dynamics of the aircraft.

Various systems are available as an alternative for estimating height above sea level, which are partially or wholly independent of the baro-altimeter input. These include using secondary surveillance radar, where a body external to the aircraft reports a measured height of the aircraft by radio, but this suffers from the limitation that someone or something is required to communicate the height to the aircraft and that the relevant surveillance instrumentation, additional to the navigation instrumentation on the aircraft, is required in order to make the measurements. Further alternatives include using the height output from a satellite range triangulation system such as the Global Positioning System (GPS) described in the Nato unclassified report STANAG 4294 (published by the military agency for standardisation) but this relies on satellite signals being available, or using the radar altimeter measurement, but as this measures height above ground level, it is unsuitable for mountainous terrain where the ground level is a significant distance from that of the sea.

There is thus a need for an improved height estimating apparatus which is substantially independent of flight dynamics and atmospheric conditions, and which can estimate height above sea level.

SUMMARY OF THE INVENTION

According to a first aspect of the present invention there is provided apparatus for estimating a first height of a vehicle above a first reference surface, including a system for determining position, velocity and attitude incorporating at least one sensing means operable to provide an output signal indicative of a vertical specific force of the vehicle, error-estimating means for receiving as input signals a horizontal reference velocity and position of the vehicle, and a radar altimeter measurement of a second height of the vehicle above a second reference surface and for providing as an output signal estimates of errors associated with the sensing means output signal, and integrating means for receiving said sensing means and error-estimating means output signals, and for subtracting the estimates of errors from the signal indicative of vertical specific force while performing a double integration of the results of the subtraction, to provide an output indicative of the required estimated first height.

Preferably the at least one sensing means is an inertial vertical specific force sensor operable to provide the output signal indicative of the vertical specific force of the vehicle.

Conveniently said first reference surface is sea level and said second reference surface is ground level.

Advantageously the error-estimating means includes a Kalman filter and a gravity corrector.

Preferably there are provided first, second and third estimator stations at which the output signal estimates of errors associated with the sensing means output signal are stored.

Conveniently the integrating means includes first and second subtractors and first and second integrators.

Advantageously the horizontal velocity and position of the vehicle forming an input to the Kalman filter is provided by the system for determining position, velocity and attitude.

According to a further aspect of the present invention there is provided a method for estimating a first height of a vehicle above a first reference surface, including the steps of operating at least one sensing means, forming part of a system for determining position, velocity and attitude of a vehicle, to provide an output signal indicative of a vertical specific force of the vehicle, inputting a horizontal velocity and position of the vehicle and a radar altimeter measurement of a second height of the vehicle above a second reference surface to error-estimating means, establishing in said error-estimating means estimates of errors associated with the sensing means output signal, and subtracting the estimates of errors from the sensing means output signal while performing a double integration of the results of the subtraction, to provide the required estimated first height.

Preferably said double integration includes a first integration, which first integration integrates the vertical specific force to provide a vertical velocity, and a second integration, which second integration integrates the vertical velocity in order to provide the required estimated first height.

Conveniently the at least one sensing means is a vertical specific force sensor, with estimates of a bias associated with the vertical specific force sensor being provided by a Kalman filter, together with estimates of a vertical velocity error and estimates of a vertical height error associated with the system for determining position, velocity and attitude.

Advantageously said subtraction of estimates of errors includes a first subtraction, which first subtraction is effected while performing the first integration and subtracts the estimate of the bias associated with the specific force sensor and a correction for gravity supplied by the gravity corrector from said vertical specific force on a continuous basis, together with a subtraction of the vertical velocity error at discrete intervals, and a second subtraction, which second subtraction is effected on the second integration at discrete intervals and subtracts the vertical height error estimate therefrom to provide the required estimated first height.

Preferably the double integration is effected at a processing cycle frequency of substantially 50 Hz and outputs the required estimated first height at an output rate of substantially 50 Hz, the radar altimeter measurement of a second height of the vehicle above a second reference surface is input to the estimating means at an input rate of substantially 12.5 Hz and the estimate of the bias of the vertical specific force sensor, the estimate of gravity, the vertical velocity error estimate and the vertical height error estimate are used to correct the double integration with a correction cycle frequency in the range of from 2 to 4 Hz.

BRIEF DESCRIPTION OF THE DRAWINGS

For a better understanding of the present invention, and to show how the same may be carried into effect, reference will now be made, by way of example, to the accompanying drawings, in which:

FIG. 2 is a block diagram illustrating an apparatus according to the present invention for carrying out the method of the present invention for estimating a first height of a vehicle above a first of the two reference surfaces of FIG. 1.

DETAILED DISCUSSION OF PREFERRED EMBODIMENTS

Figure 1:
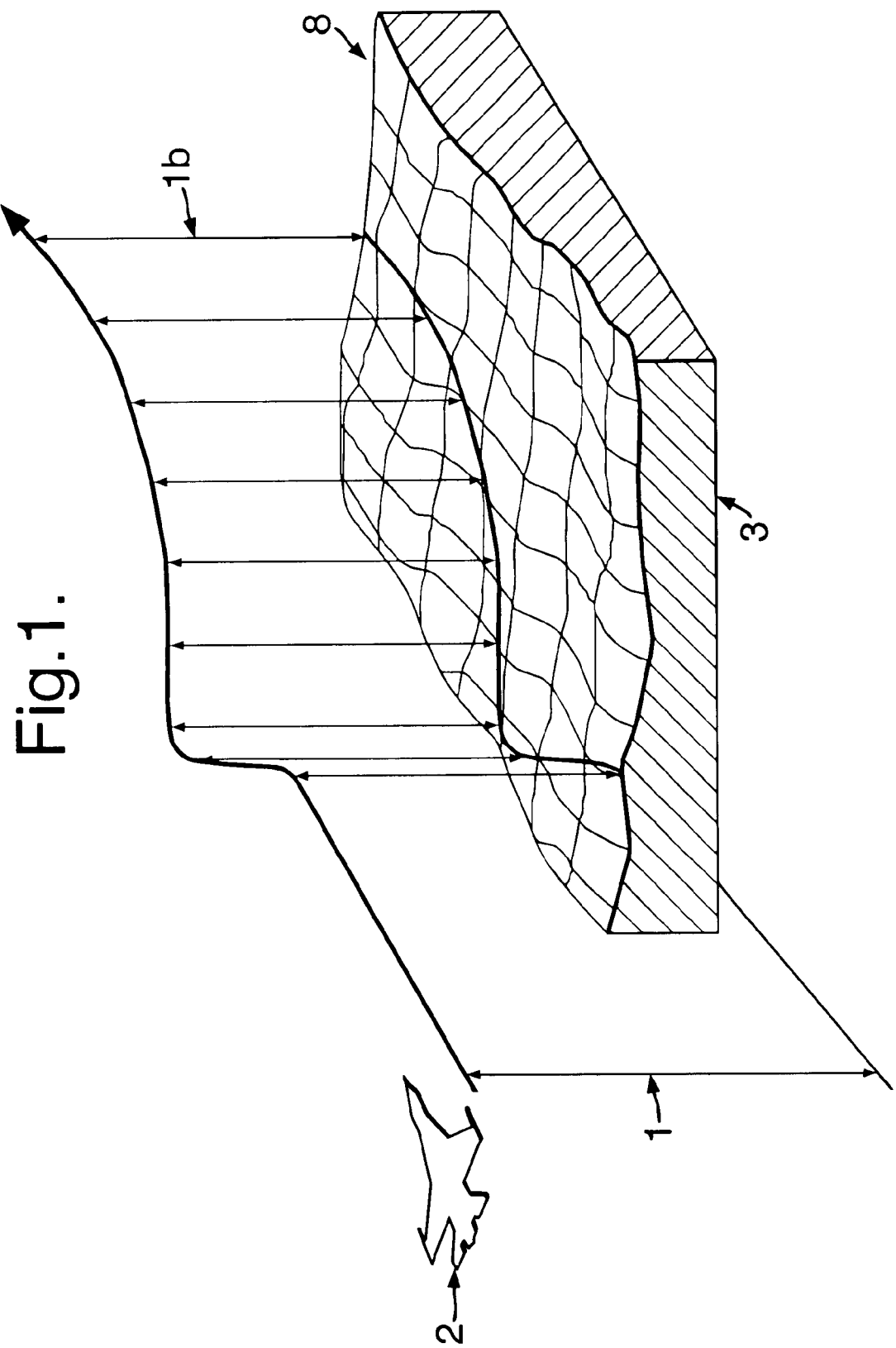
FIG. 1 is a perspective view of first and second reference surfaces relative to a typical trajectory of an airborne vehicle.

Apparatus of the invention for estimating a first height of a vehicle above a first reference surface as shown in FIGS. 1 and 2 is intended for use in situations requiring the estimate of first height to be substantially independent of variations in atmospheric and dynamic conditions. Such apparatus is thus particularly suited for use in navigation systems of airborne vehicles, specifically as a replacement for standard height measurement devices such as the baro-altimeter, which is sensitive to atmospheric conditions and the flight dynamics of the aircraft.

Thus as shown in FIGS. 1 and 2 of the accompanying drawings, apparatus for estimating a first height 1 of a vehicle 2 above a first reference surface 3, includes a system 4 for determining position and velocity incorporating at least one sensing means 4b operable to provide an output signal 5 indicative of a vertical specific force of the vehicle 2. The apparatus also includes error-estimating means, preferably a gravity corrector 19 and a Kalman filter 6. The Kalman filter 6 is for receiving as input signals a radar altimeter measurement 7 of a second height 1b of the vehicle 2 above a second reference surface 8, and a reference velocity and position in the horizontal plane which may be provided by the system 4, and for providing as an output signal 9 estimates of errors associated with the sensing means output signal 5. The output signal 9 estimates of errors are stored at first, second and third estimator stations 15, 16, 17.

Integrating means 10 forms a further part of the apparatus, which integrating means is for receiving and manipulating said sensing means and error-estimating means output signals 5, 9. This manipulation includes subtracting the estimates of errors from the signal 5 indicative of a vertical specific force at first and second subtractors 20 21, whilst performing a double integration at first and second integrators 11, 12 on the results of the subtraction, so as to provide an output indicative of the required estimated first height 1.

The at least one sensing means 4b preferably an inertial vertical specific force sensor operable to provide the output signal 5 indicative of the vertical specific force of the vehicle. As shown in FIG. 1, the first reference surface 3 is sea level, the second reference surface 8 is ground level, and the first height estimate 1 therefore provides an estimate of the height of the vehicle 2 above sea level.

The apparatus of the invention, described above, is operable to estimate a first height 1 of the vehicle 2 above a first reference surface 3 by implementing a method of the invention. The method of the invention includes the steps of operating the at least one sensing means 4b to provide an output signal 5 indicative of a vertical specific force of the vehicle 2, and inputting the radar altimeter measurement 7 to the error-estimating means 6. A further input to the error-estimating means includes horizontal position and velocity 4a, which preferably is provided by the system 4 for determining position, velocity and attitude.

In the method, the integrating means 10 combines the steps of subtracting the estimates of errors from the sensing means output signal 5 whilst performing a double integration on the results of the subtraction. The double integration includes a first integration by the first integrator 11, which first integration integrates the vertical specific force to provide a vertical velocity, and a second integration by the second integrator 12, which second integration integrates the vertical velocity in order to provide the required estimate for first height 1. The estimates of errors include an estimate of a bias associated with the vertical specific force sensor, stored at estimator station 15, an estimate of a vertical velocity error, stored at estimator station 16, and a vertical height error, stored at estimator station 17, all of which are provided by the Kalman filter 6 represented in FIG. 2.

The subtraction of the estimates of errors stored at the estimator stations 15, 16, 17 includes a first subtraction at the first subtractor 20 and a second subtraction at the second subtractor 21. The first subtraction is effected on a continuous basis while performing the first integration and subtracts the estimate of the bias associated with the specific force sensor and a correction for gravity supplied by the gravity corrector 19 from said vertical specific force. The first subtraction also includes a subtraction of the vertical velocity error from the first integration at discrete intervals as shown schematically by a first switch 13 in FIG. 2, and subtraction of the vertical velocity error therefore intermittently affects the subtractor 20. These estimates of errors, output from estimator stations 15, 16 and gravity corrector 19, are shown as a collective input 18a to subtractor 20, having first been synchronised at collecting station 18b. The second subtraction is effected on the second integration at discrete intervals, as indicated by a second switch 14 in FIG. 2. The correction for gravity 19 compensates for latitude and height with respect to gravity on the surface of the earth at the equator, and is preferably estimated using an output from a further sensing means (not shown) together with the estimate for first height 1.

Successful operation of the above method is dependent on synchronisation of the various inputs to the integrating means 10, and a preferred timing schedule is as follows. The integrating means 10 runs at a processing cycle frequency of substantially 50 Hz and outputs the estimate of first height at substantially 50 Hz An estimate of the second height 1b is input to the error-estimating means 6 at a rate of approximately 12.5 Hz, and the error estimates output from the estimator stations 15, 16, 17 are sent to update the integrating means at a rate of from between 2 to 4 Hz; once an update has been performed, the inputs from the estimator stations 15, 16, 17 to the integrating means are reset to zero for the remaining integrating means processing cycle so as the error estimates are only applied once per update cycle.

What is claimed is:

1. Apparatus for estimating a first height of a vehicle above a first reference surface, including
   a system for determining position and velocity incorporating at least one sensing means operable to provide an output signal indicative of a vertical specific force of the vehicle,
   error-estimating means for receiving as input signals a horizontal reference velocity and position of the vehicle, and a radar altimeter measurement of a second height of the vehicle above a second reference surface, and for providing as an output signal estimates of errors associated with the sensing means output signal, and integrating means for receiving said sensing means and error-estimating means output signals, and for subtracting the estimates of errors from the signal indicative of vertical specific force while performing a double integration of the results of the subtraction, to provide an output indicative of the required estimated first height.

2. Apparatus according to claim 1, wherein the at least one sensing means is an inertial vertical specific force sensor operable to provide the output signal indicative of the vertical specific force of the vehicle.

3. Apparatus according to claim 1, wherein said first reference surface is sea level and said second reference surface is ground level.

4. Apparatus according to claim 3, wherein the error-estimating means includes a Kalman filter and a gravity corrector.

5. Apparatus according to claim 4, including first, second and third estimator stations at which the output signal estimates of errors associated with the sensing means output signal are stored.

6. Apparatus according to claim 5, wherein the integrating means includes first and second subtractors and first and second integrators.

7. Apparatus according to claim 6, wherein the horizontal velocity and position of the vehicle forming an input to the Kalman filter is provided by the system for determining position and velocity.

8. A method for estimating a first height of a vehicle above a first reference surface, including the steps of operating at least one sensing means, forming part of a system for determining position and velocity of a vehicle, to provide an output signal indicative of a vertical specific force of the vehicle, inputting a horizontal velocity and position of the vehicle and a radar altimeter measurement of a second height of the vehicle above a second reference surface to error-estimating means, establishing in said error-estimating means estimates of errors associated with the sensing means output signal, and subtracting the estimates of errors from the sensing means output signal while performing a double integration of the results of the subtraction, to provide the required estimated first height.

9. A method according to claim 8, in which said double integration includes a first integration, which first integration integrates the vertical specific force to provide a vertical velocity, and a second integration, which second integration integrates the vertical velocity in order to provide the required estimated first height.

10. A method according to claim 9, in which the at least one sensing means is a vertical specific force sensor, with estimates of a bias associated with the vertical specific force sensor being provided by a Kalman filter, together with estimates of a vertical velocity error and estimates of a vertical height error associated with the system for determining position and velocity.

11. A method according to claim 10, in which said subtraction of estimates of errors includes a first subtraction, which first subtraction is effected while performing the first integration and subtracts the estimate of the bias associated with the specific force sensor and a correction for gravity supplied by the gravity corrector from said vertical specific force on a continuous basis, together with a subtraction of the vertical velocity error at discrete intervals, and a second subtraction, which second subtraction is effected on the second integration at discrete intervals and subtracts the vertical height error estimate therefrom to provide the required estimated first height.

12. A method according to claim 11, in which the double integration is effected at a processing cycle frequency of substantially 50 Hz and outputs the required estimated first height at an output rate of substantially 50 Hz, the radar altimeter measurement of a second height of the vehicle above a second reference surface is input to the estimating means at an input rate of substantially 12.5 Hz, and in which the estimate of the bias of the vertical specific force sensor, the estimate of gravity, the vertical velocity error estimate and the vertical height error estimate are used to correct the double integration with a correction cycle frequency in the range of from 2 to 4 Hz.

* * * * *